(12) United States Patent
Gauckler et al.

(10) Patent No.: US 9,366,365 B2
(45) Date of Patent: Jun. 14, 2016

(54) REINFORCEMENT METHODS FOR COMPOSITE TUBE FOR FLUID DELIVERY SYSTEM

(71) Applicants: Andreas Manfred Gauckler, Lafayette, CO (US); Joseph Brice Diller, Granbury, TX (US); Richard L. Statler, III, Denver, CO (US); David Ethan Maretich, Denver, CO (US); Nicholas Clancy Schooley, Denver, CO (US); Clifton P. Breay, Littleton, CO (US)

(72) Inventors: Andreas Manfred Gauckler, Lafayette, CO (US); Joseph Brice Diller, Granbury, TX (US); Richard L. Statler, III, Denver, CO (US); David Ethan Maretich, Denver, CO (US); Nicholas Clancy Schooley, Denver, CO (US); Clifton P. Breay, Littleton, CO (US)

(73) Assignee: Eaton Corporation, Cleveland, OH (US)

( * ) Notice: Subject to any disclaimer, the term of this patent is extended or adjusted under 35 U.S.C. 154(b) by 368 days.

(21) Appl. No.: 13/922,546

(22) Filed: Jun. 20, 2013

(65) Prior Publication Data
US 2013/0284303 A1     Oct. 31, 2013

Related U.S. Application Data

(63) Continuation-in-part of application No. 12/983,069, filed on Dec. 31, 2010, now Pat. No. 9,022,077.

(51) Int. Cl.
*F16L 11/00*     (2006.01)
*F16L 9/133*     (2006.01)
(Continued)

(52) U.S. Cl.
CPC .............. *F16L 9/133* (2013.01); *B29C 70/446* (2013.01); *B29C 70/882* (2013.01); *F16L 9/125* (2013.01); *F16L 9/128* (2013.01); *B29L 2023/22* (2013.01); *Y10T 156/1051* (2015.01)

(58) Field of Classification Search
CPC .................................. F16L 9/12; F16L 11/112

USPC .......................... 138/123–126; 428/36.1, 36.3
See application file for complete search history.

(56) References Cited

U.S. PATENT DOCUMENTS 2,783,174 A     2/1957    Stephens
2,824,033 A     2/1958    Chase
(Continued)

FOREIGN PATENT DOCUMENTS

EP       0028310       5/1981
EP       0391568      10/1990
(Continued)

OTHER PUBLICATIONS

International Search Report and Written Opinion for International (PCT) Application No. PCT/US2014/041476, mailed Sep. 17, 2014, 14 pages.

(Continued)

*Primary Examiner* — Patrick F Brinson
(74) *Attorney, Agent, or Firm* — Sheridan Ross P.C.

(57) ABSTRACT

The composite tube comprises a tubular arrangement of knitted fiber characterized by a plurality of interlocking loops. The tubular knitted pattern allows for variable electrical, mechanical and geometrical tube options. A matrix material is applied over the knitted fiber pattern and is allowed to cure. The matrix material may include a combination of resin and epoxy constituents.
The matrix material may be applied by a vacuum bag molding process. The flexible knitted reinforcing layer allows use of an inflatable bladder to hold the reinforcing layer in the desired shape, thereby facilitating tube constructions of varying shapes and diameters. Continuous application of the matrix material avoids overlapping seams that are prone to delamination. Methods are provided for reinforcing the composite tube construction including one or more folded layers of knitted fiber, a reinforcing wrap made of knitted fiber, and an inflatable balloon element in combination with a layer(s) of knitted fiber.

19 Claims, 9 Drawing Sheets

(51) Int. Cl.
*B29C 70/44* (2006.01)
*B29C 70/88* (2006.01)
*F16L 9/128* (2006.01)
*F16L 9/12* (2006.01)
*B29L 23/00* (2006.01)

(56) References Cited

U.S. PATENT DOCUMENTS

| | | | |
|---|---|---|---|
| 2,945,531 A | 7/1960 | Balcom et al. | |
| 3,091,848 A | 6/1963 | Frank | |
| 3,202,560 A | 8/1965 | Michael | |
| 3,314,450 A | 4/1967 | Doering et al. | |
| 3,627,601 A | 12/1971 | Hayes et al. | |
| 3,654,967 A * | 4/1972 | Atwell | F16L 11/112 138/144 |
| 3,812,885 A | 5/1974 | Sajben et al. | |
| 3,848,640 A | 11/1974 | Crawford et al. | |
| 3,874,970 A | 4/1975 | Dunn | |
| 3,920,049 A * | 11/1975 | Lippert | B29C 57/00 138/109 |
| 3,971,233 A | 7/1976 | Amaya et al. | |
| 4,018,250 A * | 4/1977 | Waters | C08F 283/10 138/140 |
| 4,021,180 A | 5/1977 | Smith | |
| 4,065,339 A | 12/1977 | Lippert et al. | |
| 4,131,701 A | 12/1978 | Vanauken | |
| 4,200,126 A | 4/1980 | Fish | |
| 4,208,373 A * | 6/1980 | Matovich | B01J 12/005 138/109 |
| 4,241,763 A | 12/1980 | Antal et al. | |
| 4,330,811 A | 5/1982 | Bordner | |
| 4,438,958 A | 3/1984 | De Cenzo | |
| 4,600,615 A | 7/1986 | Hyodo et al. | |
| 4,657,623 A | 4/1987 | Wesch | |
| 4,671,096 A | 6/1987 | Crosby, Jr. | |
| 4,675,780 A | 6/1987 | Barnes et al. | |
| 4,800,113 A | 1/1989 | O'Connor | |
| 4,838,971 A | 6/1989 | Cacak | |
| 4,846,392 A | 7/1989 | Hinshaw | |
| 4,868,038 A | 9/1989 | McCullough, Jr. et al. | |
| 4,871,491 A | 10/1989 | McMahon et al. | |
| 5,015,013 A | 5/1991 | Nadin | |
| 5,045,251 A | 9/1991 | Johnson | |
| 5,071,506 A | 12/1991 | Nelson et al. | |
| 5,090,742 A | 2/1992 | Cohen et al. | |
| 5,097,870 A | 3/1992 | Williams | |
| 5,113,551 A | 5/1992 | Roberts | |
| 5,132,168 A | 7/1992 | Meyn et al. | |
| 5,139,710 A | 8/1992 | Smith | |
| 5,152,630 A | 10/1992 | Walloch | |
| 5,252,984 A | 10/1993 | Dorrie et al. | |
| 5,290,230 A | 3/1994 | Ainsworth et al. | |
| 5,323,631 A | 6/1994 | Weykamp et al. | |
| 5,437,899 A | 8/1995 | Quigley | |
| 5,468,327 A | 11/1995 | Pawlowicz et al. | |
| 5,472,769 A | 12/1995 | Goerz, Jr. et al. | |
| 5,549,024 A | 8/1996 | Ricci | |
| 5,746,555 A | 5/1998 | McEvoy | |
| 6,183,904 B1 | 2/2001 | Kuboshima et al. | |
| 6,240,969 B1 | 6/2001 | Wildermuth | |
| 6,244,092 B1 | 6/2001 | Grobbenhaar | |
| 6,315,004 B1 | 11/2001 | Wellman et al. | |
| 6,357,485 B2 | 3/2002 | Quigley et al. | |
| 6,409,222 B1 | 6/2002 | Donoho et al. | |
| 6,523,230 B1 | 2/2003 | Weinhold | |
| 6,953,061 B2 | 10/2005 | Della Putta et al. | |
| 7,144,625 B2 | 12/2006 | Tunis | |
| 7,150,932 B1 | 12/2006 | Hofler et al. | |
| 7,200,973 B2 | 4/2007 | Tunis | |
| 7,267,739 B2 | 9/2007 | Blackmore et al. | |
| 7,309,324 B2 * | 12/2007 | Hayes | A61M 25/104 604/96.01 |
| 7,330,559 B2 | 2/2008 | Akino | |
| 7,354,419 B2 * | 4/2008 | Davies, Jr. | A61M 25/104 604/103.06 |
| 7,588,056 B2 | 9/2009 | Lord et al. | |
| 7,635,510 B2 * | 12/2009 | Horn | A61L 29/126 428/34.1 |
| 7,931,958 B2 | 4/2011 | Arai et al. | |
| 7,972,371 B2 | 7/2011 | Martin | |
| 8,176,943 B2 | 5/2012 | Stroempl et al. | |
| 8,678,036 B2 * | 3/2014 | Kubel | F16L 55/1651 138/124 |
| 2003/0024584 A1 | 2/2003 | Godel et al. | |
| 2004/0134555 A1 | 7/2004 | Powell et al. | |
| 2004/0222013 A1 | 11/2004 | Lindner | |
| 2005/0212161 A1 | 9/2005 | Aisenbrey | |
| 2008/0183132 A1* | 7/2008 | Davies | A61M 25/104 604/103.09 |
| 2009/0229452 A1 | 9/2009 | Milwich et al. | |
| 2010/0003840 A1 | 1/2010 | Breay et al. | |
| 2010/0011694 A1 | 1/2010 | Spaans et al. | |
| 2010/0116941 A1 | 5/2010 | Ciolcyzk et al. | |
| 2010/0147446 A1 | 6/2010 | Ciolczyk et al. | |
| 2011/0174410 A1 | 7/2011 | Li et al. | |
| 2011/0254444 A1 | 10/2011 | Yeulash et al. | |
| 2011/0262682 A1 | 10/2011 | Wynn et al. | |
| 2012/0090770 A1 | 4/2012 | Cavaliere et al. | |
| 2012/0103683 A1 | 5/2012 | Ishida | |
| 2012/0152584 A1 | 6/2012 | Goodson | |
| 2012/0168012 A1 | 7/2012 | Statler, III et al. | |
| 2013/0277083 A1 | 10/2013 | Gauckler et al. | |
| 2013/0284299 A1 | 10/2013 | Schooley et al. | |

FOREIGN PATENT DOCUMENTS

| | | |
|---|---|---|
| EP | 1749642 | 2/2007 |
| GB | 1174292 | 12/1969 |
| GB | 1506182 | 4/1978 |
| GB | 2211266 | 6/1989 |
| WO | WO 01/41993 | 6/2001 |
| WO | WO 03/023104 | 3/2003 |
| WO | WO 2009/087372 | 7/2009 |

OTHER PUBLICATIONS

Partial International Search Report for International (PCT) Application No. PCT/US2014/041471, mailed Sep. 25, 2014, 7 pages.
International Search Report and Written Opinion for International (PCT) Application No. PCT/US2014/042033, mailed Oct. 1, 2014, 13 pages.
Watson "Building composite tubes with WEST SYSTEM® epoxy and braided fibers," EPOXYWORKS, Spring 2008, No. 26, 3 pages.
"Guide to Vacuum Bagging," Lavender, http://www.lavender-ce.com/wp-content/uploads/guide-to-vacuum-bagging.pdf, date unknown, 3 pages.
"Technology Overview," COMPOTECH Structural Composit Tubes, http://www.compotech.com/downloadfile.aspx?&dl=2, date unknown, 8 pages.
"Circular knitting," Wikipedia, http://en.wikipedia.org/wiki/Circular_ting, printed Oct. 27, 2010, 1 page.
"Knitting," Wikipedia, http://en.wikipedia.org/wiki/Knitting, printed Oct. 29, 2010, 18 pages.
International Search Report and Written Opinion for International (PCT) Patent Application No. PCT/US2014/041471, mailed Dec. 11, 2014 19 pages.

* cited by examiner

REINFORCEMENT METHODS FOR COMPOSITE TUBE FOR FLUID DELIVERY SYSTEM

CROSS REFERENCE TO RELATED APPLICATIONS

This application is a continuation-in-part application of co-pending application Ser. No. 12/983,069 filed on 31 Dec. 2010 and entitled: Composite Tube For Fluid Delivery System, of which said application is hereby incorporated by reference in its entirety.

FIELD OF THE INVENTION

The present invention relates to composite tubes used in fluid delivery systems, and more particularly, to methods to reinforce composite tubes to increase the strength of composite tubes especially adapted for use in fluid delivery of fuel in vehicles or aircraft.

BACKGROUND OF THE INVENTION

Polymer based compositions are becoming increasingly used in a variety of different technological applications to include vehicle and aerospace applications. Polymer based composites are used in not only structural applications, but also in construction of system components in order to control the electrical conductivity and resistivity of the components. Polymers widely vary in their ability to dissipate static charges and to prevent the composite material from acting as a mere conductor of electrical current.

Polymeric composites with both conductive and non-conductive properties can be chosen by incremental addition of selected materials such as carbon black, carbon fiber, metallic fibers and powders, as well as selecting inherently conductive polymeric compositions such as polyaniline. Further, it is known that by varying the amount of conductive or resistive particles added to the composition, some incremental control can be obtained for establishing the conductive or resistive properties of the material.

Fuel lines, particularly those used in aircraft, should preferably have the ability to accommodate a wide range of electrical performance requirements depending upon the location of the fuel line, the type of fuel line and other factors. It is desirable to have fuel lines that are resistant enough to prevent them from acting as conductors of electrical current such as caused by a lightening strike, yet the fuel lines should be conductive enough to prevent static charge build up that could result in an electrical arc creating a spark within the fuel line.

Various efforts have been made to isolate fuel lines to ensure the fuel lines maintain the desired electrical properties; however, traditional fuel lines are unable to accommodate wide electrical performance requirements when comparing an event such as a lightning strike versus slow but incremental static buildup.

One example of a reference that discloses fuel lines with controlled resistivity includes the International Publication Number WO2009/087372. This reference describes a glass reinforced composite pipe having an electrically nonconductive polymeric resin matrix and an electrically nonconductive tow reinforcement such as glass fiber. The composition further includes a selected dispersion of an electrically conductive particulate filler, such as carbon black in which the resistivity of the outer portion of the composite pipe is preferably set between 50 K-ohms per meter length and 4 M-ohms per meter length.

Another reference that addresses electrical conductivity problems associated with fuel carrying pipes or tubes is the European Patent Application Publication No. 0028310. This reference discloses a filament reinforced plastic article having a fluid impermeable wall with a relatively low surface resistivity to prevent build up of electrostatic charge. The article includes overlapping bands of filament coated with a plastic material. A minor portion of the filament in some of the bands is electrically conductive by use of electrically conductive filaments that may be distributed throughout the wall of the article.

Another example of a fuel pipe or tube addressing desired electrical properties is the U.S. Patent Application Publication No. U.S. 2010/011,694. This reference describes ducting comprising at least one multi-layer pipe having respective inner and outer layers made of a composite plastic material, and reinforced by an electrically conductive reinforcing layer. An intermediate layer is provided for stiffening of the pipe when flexed and/or to insulate the pipe. Each of the inner and outer layers has at least one winding with contiguous turns of a material made of a composite thermoplastic. The pipe is able to discharge electrostatic build up through its inner layer, and electrical charges due to lightening are deflected away from the pipe through its outer layer.

While these references may be adequate for their intended purposes, there is still a need to provide fluid conveying tubes or pipes that are economical to manufacture, and may accommodate wide ranges of electrical specifications both for static discharge and lightening protection. Further, there is need to provide a tube or pipe construction that can be shaped and sized for many different applications. For example, there is a need to provide the capability of manufacturing fuel lines for aircraft in which the tubes can be easily sized and shaped to fit within constrained spaces.

One limitation associated with fluid conveying tubes in general is that methods of manufacturing are limited to providing reinforcing layers in a single preselected configuration.

For example, braided tubes are known to include a metallic braiding material to enhance tube strength, but are clearly limited in that the braided configuration is not easily configurable between adjacent sections of tube and is not configurable to be changed within the same section of tube. The braided metallic material cannot be easily altered without a significant manufacturing process change. Therefore, the braided material typically remains consistent throughout the tubing used in a particular fluid conveying system. Further, metallic reinforcing layers are difficult to be formed into curved or irregular shapes, making their use more difficult to use within fluid conveying systems that have multiple bends or turns.

One particular problem associated with composite tubing is delamination that can occur between joined sections of tubes or layers among tubes. The most common manufacturing practice is to simply overlap abutting edges of tube sections to be joined. Although initially these overlapping edges may provide an adequate structural connection, vibration and chemical degradation by contact of the fuel with the composite material eventually results in some degree of delamination. Particularly in pipe runs that must follow a torturous path, there may be multiple sections of tubes/pipes that are joined. In these cases, it may be impractical or impossible to use mechanical couplers at each junction due to weight and size constraints. Therefore, there is also a need to provide a composite tube construction in which long continuous pipe runs having complex shapes are created without a concern for delamination between abutting tube sections.

Although there have been advances made with respect to the chemical aspects of composite materials, most present day aircraft are still constructed with metallic tubing (such as aluminum, stainless steel, or titanium). In order to electrically tune these metallic tubes, various static discharge and electrical isolators are required, which add cost and weight to the aircraft.

SUMMARY OF THE INVENTION

In accordance with the invention, a composite tube is provided that is especially adapted for use in fluid delivery systems containing fuel or other corrosive chemical formulations. The invention further comprises a method of manufacturing the composite tube as well as a composite tube system in which a plurality of composite tubes are connected for delivery of a fluid within a larger assembly, such as a vehicle or aircraft.

The composite tube comprises a tubular arrangement of fiber created by a knitted fibrous pattern characterized by a plurality of interlocking loops. The term "knitted fiber" is defined as group of fibers that are interconnected by a plurality of consecutive loops or stitches. As each row of loops is formed, a new loop is pulled through an existing loop. Selected knitted patterns may be formed to provide the desired density or spacing between the fibers. The meandering path or course of the fibers can be adjusted in terms of spacing of the consecutive loops to achieve the desired density of fibers per unit area. As distinguished from weaving in which threads or fiber extend linearly and substantially more parallel in a lengthwise or crosswise direction, the knitted pattern of the present invention comprises fibers that follow meandering paths to form loops. The loops may be symmetric or irregular shaped. Accordingly, the course or paths of the knitted fibers have multiple directional changes to include at least one directional change of approximately 180 degrees in order to form a loop. The knitted pattern has an inherent bias or stretch/contracting capability that enables a user to further adjust the density or spacing of the fibers by selectively stretching the fibers to a desired shape. A particular knitted pattern can be chosen to also modify the desired spacing and density of the knitted fibers. Examples of different knitted patterns could include plain or pearl stitching. Other types of knitting may be used to further adjust knitted pattern parameters such as fiber density. These other types of knitting may include warp knitting, weft knitting and plaited stitching.

A number of features of the composite tube can be precisely controlled with the use of a knitted pattern. For example, different types of fiber can be knitted to adjust the conductivity or resistivity of the composite tube. Monitoring devices can also be incorporated in the knitted pattern, such as various strain gauges or other sensors.

The particular geometry of the composite tube can be made in an infinite number of shapes based on the ability to knit tubular sections in desired shapes. Not only can the diameter of the tube be changed, but also turns or bends and other features can be created. Intersecting sections of tubes can be attached by stitching the abutting faces to one another. Thus, the knitted pattern of fibers can be considered a continuous integral support structure which eliminates the requirement for overlapping sections at tube intersection points, thereby avoiding delamination between the layers of material.

A circular knitting machine can be used to create the tubular knitted patterns. One example of a circular knitting machine comprises a cylinder rotatable in one or both directions. A series of circumferentially spaced needle slots are located on a peripheral surface. A series of individually movable knitting needles are reciprocated in the associated needle slots. A series of jacks are arranged below the associated needles in an end to end relationship for reciprocating with the associated needles in the needle slots. Each of the jacks has a butt extending out of the associated needle slot. A camming mechanism includes a number of raising cams arranged to define a cam track through which each butt passes when the cylinder is rotating. The knitting can be affected whenever each butt of the jack comes in contact with the raising cams, and is thereby moved along with the associated needle upwardly in the associated needle slot. This machine is described in the U.S. Pat. No. 3,971,233, and this reference is hereby incorporated by reference for the purpose of disclosing a circular knitting machine capable of producing a tubular configuration of a knitted pattern.

The use of a conventional circular knitting machine such as used for fabrics is capable of creating the tubular arrangement of fiber in the present invention. The fiber may include materials such as Kevlar®, carbon fiber, glass, and combinations thereof. The tubular knitted pattern provides for variable electrical, mechanical, and geometrical options that are difficult if not impossible to achieve with conventional composite tube manufacturing processes.

Once the knitted pattern is completed, the composite tube is then formed by a vacuum bag molding process. In general, a vacuum bag molding process involves a two sided mold that shapes both the internal and external surfaces of an object. Typically, the interior mold or mandrel is rigid, and the exterior mold is a flexible membrane or vacuum bag. In the present invention, in lieu of a rigid inner core or mandrel, an inflatable bladder is placed within the knitted pattern to create internal pressure. Preferably, the inflatable bladder is provided in a twisted, helical pattern that ensures the inflatable bladder is capable of applying even internal pressure against the knitted pattern that may have various turns or changes in diameter. The twisted helical pattern enables the bladder to be inflated beyond just a cylindrical shape. The bladder has excess material that can fill larger spaces or may easily fit within smaller areas thereby accommodating different shaped tubes to be formed. Once the inflatable tube is in place, a polymeric matrix is applied over the knitted pattern. The matrix material flows between the gaps in the knitted pattern and the matrix material is provided in sufficient quantity to create a desired thickness based on tube specifications. Preferably, the matrix material is the combination of a composite resin and epoxy formulated with the desired properties for the particular tube application.

Once the matrix is applied, additional layers are placed over the matrix to include a perforated plastic or relief plastic layer, an absorptive layer over the perforated plastic layer, and an external impervious vacuum bag over the absorptive material. A vacuum port is provided for the drawing of a vacuum to remove air, and to thereby provide a compressive force against the matrix layer. The external pressure can be increased by placing the assembly in an autoclave which can increase the differential pressures. The excess matrix material is allowed to flow through the perforated plastic layer and is absorbed within the absorptive layer. The matrix is allowed to cure, and molding materials are then removed leaving a composite tube shell which can be trimmed and finished. Finishing may include painting, part marking, application of decals, etc.

Modular and adjustable external fixturing may be used to hold critical geometry areas on the tube such as neck downs, mount points, and end configurations. This modular/adjustable exterior fixturing can also be used to secure flanges or other hardware, and may be attached to the ends of the tube or other locations on the tube.

By controlling the electrical and mechanical properties of both the fiber material and the matrix material, the desired resistive properties can be achieved. By machining and otherwise finishing the tube, the surface and volumetric resistivity of the product can also be adjusted.

As mentioned with respect to the integral or one piece fiber knitted pattern, delamination is avoided at tube intersection points or other areas where separate tube sections are joined since the matrix material can be applied continuously across these intersection points. A continuously extending tubular fiber in combination with the continuously applied matrix material avoids all laminated seams or overlapping areas.

It is well known that most composite tubes are formed on rigid inner mandrels having limited flexibility. This reduces the available geometries for a tube to be formed because ultimately, the mandrel must be removed from the interior of the tube section. In the present invention, the shape holding feature of a tube design is built into the underlying fiber pattern itself. This method therefore allows for use of a very flexible and collapsible inner mold such as the inflatable bladder. Nevertheless, a vacuum bag molding technique can be used for necessary internal and external compressed molding, while critical exterior features and varied end configurations can be held in place by modular exterior fixturing. The manufacturing method of the invention therefore allows for extreme variability in creating tube intersections, small turn radii, varied diameters, varied shapes, and also contributes to very low tooling costs. Therefore, it is apparent that the term "tube" or "tubing" of the present invention covers not only circular shaped cross sectional elements, but also a wide range of other hollow shapes in which varied diameters and shapes can be used to complete the entire array of differing fluid conveying elements within a fluid conveying system.

Further, this manufacturing method allows for the construction of very long pipe runs that traditionally require many laminated seams or junctions attached by couplers. The manufacturing method also allows for electronic integration of various monitoring sensors or heating elements to control temperatures, for example to comply with anti-icing requirements for aircraft. The composite tube of the present invention provides many material advantages to include a non-metallic, a seamless composite that can be formed into an infinite number of rigid shapes, and the composite tube is tunable for fine/incremental variations of electrical and mechanical properties.

In another aspect of the invention, a method is provided for reinforcing composite tubes by selectively configuring the knitted reinforcement layer to meet strength specifications for the tubes. In a first preferred embodiment, the method includes providing an overlapping configuration of the knitted reinforcement layer in which the knitted reinforcement layer is manufactured to be approximately twice the length of the intended final length of the tube, and the knitted reinforcement layer is folded back over itself to provide two layers of knitted reinforcement. In another preferred embodiment, the method includes providing an overlapping configuration of the reinforcement layer for a complex tube shape in which the knitted reinforcement layer includes a first section constructed in the general shape of the complex tube shape, and a second section connected to the first section that is a mirror image of the first section. The second section is then folded back over itself and over the first section two create a dual layered knitted reinforcement. By using this overlapping knit feature, it is also possible to create knitted reinforcement having more than two layers. For example, for reinforcing a tube shape having a 90° bend in the tube, the knitted reinforcement could be manufactured with four 90° bend sections connected in series. Consecutive folding of the 90° sections results in a knitted reinforcement of four distinct layers. In another preferred embodiment, the method includes reinforcing the composite tubes by provision of a reinforcing wrap that is secured to the exterior surface of an existing tube. The existing tube could be made of the preferred matrix material, or another selected material to enhance strength for the finished composite tubing. An additional layer of matrix material or lamination is then applied to cover the reinforcing wrap, thereby completing the reinforced composite tubing. In yet another preferred embodiment, the method includes reinforcing the composite tubes by provision of a flexible and/or elastomeric layer placed within the knitted reinforcement layer. According to this method, the flexible/elastomeric layer could be in the form of an inner inflatable balloon element. This method involves expanding the inflatable inner balloon element to contact the interior surface of the knitted reinforcement layer. Once the balloon is expanded, the matrix material is applied to bond the inner balloon element to the knitted reinforcement layer. The inner balloon element serves not only as a reinforcing layer, but also as a chemical barrier between fluid conveyed within the tube and the matrix material. Further, the inner balloon element could also be used as an interior shaping mandrel, thereby eliminating the need for a removable mandrel or external die to shape the composite tube.

Considering the above described features of the invention, the invention can therefore be considered in one aspect a method of reinforcing a composite tube comprising: (i) providing a knitted reinforcement material comprising a plurality of interlocking loops of fiber, said knitted reinforcement material having first and second ends; (ii) folding said second end of said material back over itself towards said first end to form a dual layered configuration; (iii) applying a matrix over said dual layered configuration, said matrix comprising resin and epoxy constituents, said matrix filling voids between said loops of fiber and between and around both layers of said dual layered configuration, said matrix having an internal surface extending radially inward beyond an inner layer of said dual layered configuration and an external surface extending radially outward beyond an outer layer of said dual layered configuration thereby forming a reinforced composite tube of a desired thickness.

In another aspect of the invention, it may also be considered a method of reinforcing a composite tube comprising: (i) providing a knitted reinforcement material comprising a plurality of interlocking loops of fiber, said knitted reinforcement material having first and second ends; (ii) providing an interior inflatable balloon element placed in contact with an interior surface of said knitted reinforcement material; and (iii) applying a matrix over said knitted reinforcement material, said matrix comprising resin and epoxy constituents, said matrix filling voids between said loops of fiber, said matrix having an internal surface in contact with said interior inflatable balloon element and an external surface extending radially outward and beyond said knitted reinforcement material, thereby forming a reinforced composite tube of a desired thickness in which an interior surface of said composite tube is defined by an interior surface of said inflatable balloon element, and an exterior surface of said composite tube is defined by said external surface of said matrix.

In yet another aspect of the invention, it may also be considered a method of reinforcing a composite tube comprising: (i) providing an existing tube; (ii) wrapping a reinforcing layer over an exterior surface of said existing tube; and (iii) securing said reinforcing layer to said existing tube with a first matrix material applied over said reinforcing layer wherein a composite tube is formed in which an interior surface of said composite tube is defined by an internal surface of said existing tube and an exterior surface of said composite tube is defined by an external surface of said first matrix material.

For each of these described methods, the invention may also be considered reinforced composite tubes constructed with the elements described in the methods.

Other features and advantages of the present invention will become apparent from the detailed description taken in conjunction with the drawings.

DETAILED DESCRIPTION

Figure 1:
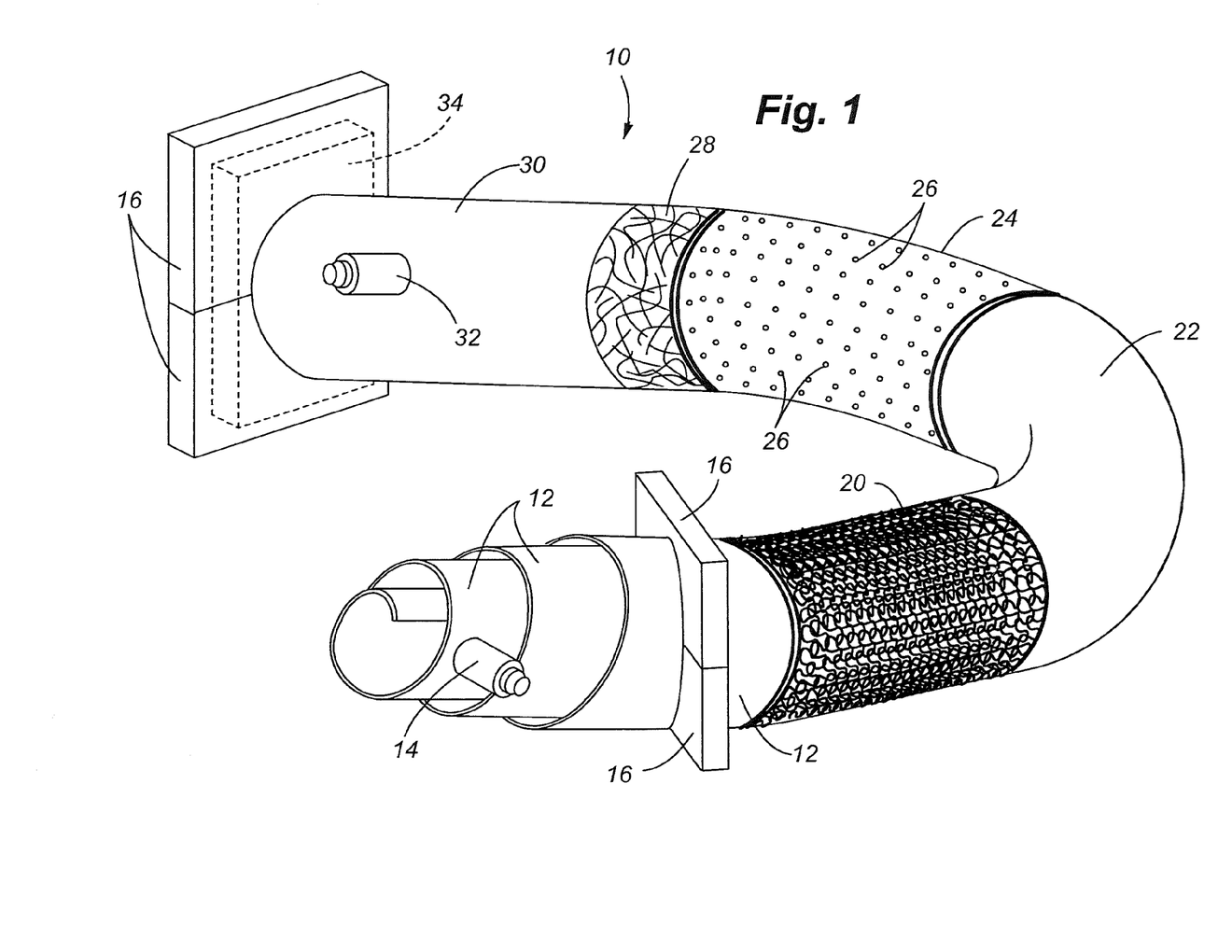
FIG. 1 is a perspective view of a section of composite tubing formed in accordance with a vacuum bag molding method.

Referring to FIG. 1, a method of manufacturing the composite tube of the present invention is illustrated. The composite tube 10 is formed by a vacuum bag molding process. For illustrative purposes, the successive layers of material are shown as exposed. First, a spiraled inner bladder 12 is placed within the interior opening of a knitted reinforcement layer 20. The tubular knitted pattern formed for the reinforcement layer 20 is constructed with the previously described knitted pattern having a selected group of fibers formed in a plurality of loops. The inner bladder 12 is inflated through inflation port 14, in order to expand the knitted reinforcement layer 20 to a desired diameter or shape. Additionally, the knitted reinforcement layer 20 is shown as having a bend. The reinforcement layer can be knitted with the bend. This type of knitting to produce a bend could be similar to the formation of a bend in a woven garment, such as the heel portion of a knitted sock or slipper.

Each end of the composite tube section to be formed may have external fixtures 16 secured thereto to stabilize the shape of the composite tube, and to otherwise provide a means by which external hardware may be secured to the tube structure. In the example of FIG. 1, the external fixture 16 on the left side of the diagram includes an opening for holding a piece of hardware such as a flange 34 that may be secured to the composite tube during the vacuum bag molding process. The external fixture can also be used to modify the tube shape, for example, a rigid box shaped fixture placed over and end of the tube can be used to restrict the expansion and form the final product into a tube having a geometrical shaped end with flat sides. In addition to use of fixtures on the ends of the tubes, the fixtures 16 may be placed at intermediate or interior sections of the tube between the ends in order to stabilize the shape of the tube at that intermediate location(s).

Next, a matrix layer 22 is placed over the knitted reinforcement layer 20, the matrix preferably including components of resin and epoxy materials. The matrix material is typically in a liquid form that enables the matrix layer to flow between the gaps in the knitted reinforcement layer 20, and to otherwise fully encapsulate the knitted layer 20. The amount of matrix is applied to set the desired external and internal tube diameters. The matrix may be applied in a number of ways, such as by an atomized spray, or by brushing the matrix layer over the knitted layer.

After the matrix material is applied, a perforated plastic layer 24 is placed over the matrix layer 22. The perforated plastic layer 24 comprises a plurality of perforations 26 as shown.

Next an absorptive layer 28 is placed over the perforated plastic layer 24. Finally, an impermeable vacuum bag 30 is placed over the absorptive layer 28. A vacuum port 32 is formed on the vacuum bag. A vacuum is applied through the vacuum port to remove air between the layers of material, thereby resulting in an external force applied to the matrix layer 22. This external force can be increased as mentioned by placing the assembly in a pressurized chamber such as an autoclave. Excess matrix material is allowed to flow through the perforations 26, and the absorptive layer 28 absorbs a significant portion of the excess matrix material flowing through the perforations.

The composite tube is then allowed to cure, and curing may be accelerated by heating in an oven or autoclave. After curing, the external layers are stripped from the cured and hardened matrix layer. The spiraled inner bladder 12 is deflated, and then removed leaving the composite tube. The tube may then finished by polishing the exposed surfaces and painting, or the tube may be left unfinished. Although the preferred embodiment shows the use of both the absorptive and perforated layers, it shall be understood that the particular vacuum bag molding process chosen may incorporate other layers or may eliminate one or more of these layers based on the particular type of tube section to be created.

Figures 2, 3, 3A, 3B:
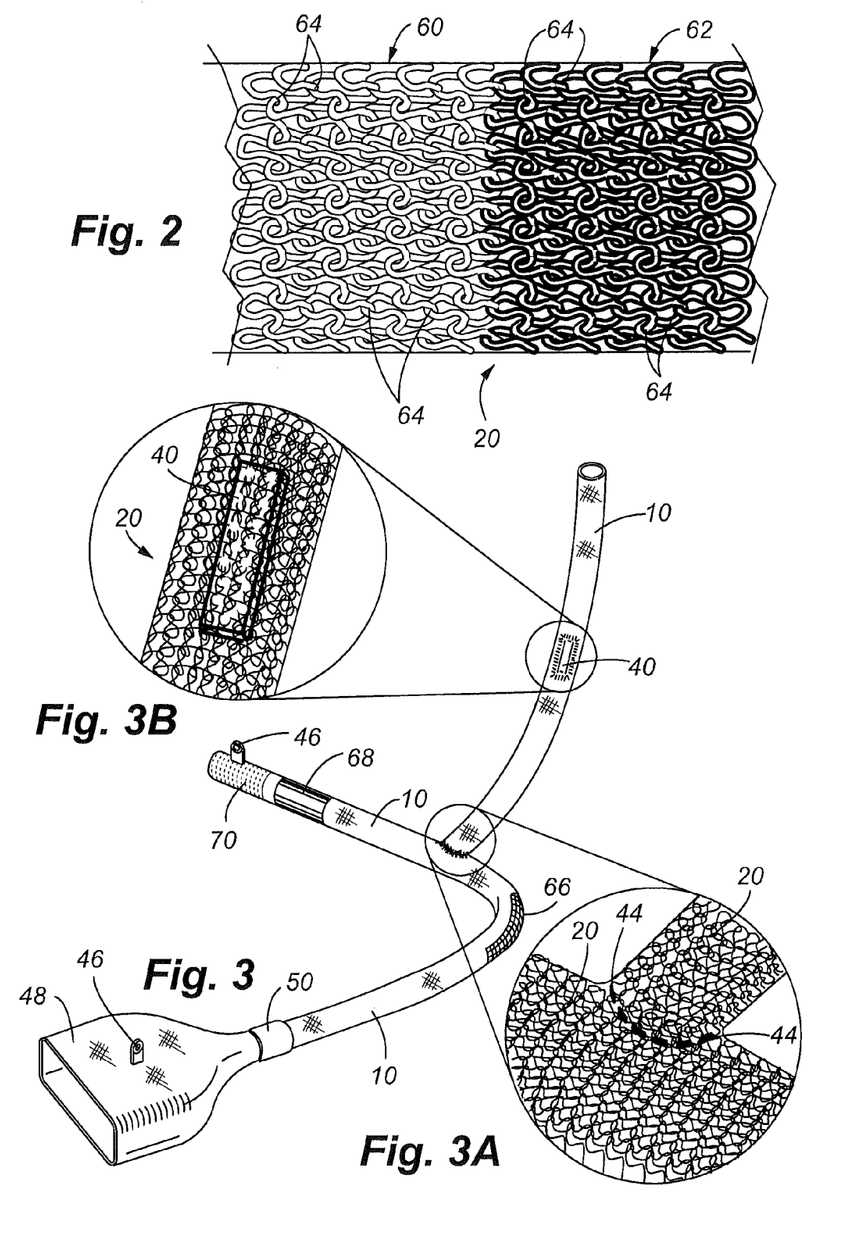
FIG. 2 is a plan view of one example of a knitted pattern usable with the tubular arrangement of fiber of the present invention.
FIG. 3 is a perspective view of a finished composite tube having a plurality of features.
FIG. 3A is a greatly enlarged perspective view illustrating the knitted connection between abutting sections of tubing.
FIG. 3B is a greatly enlarged perspective view illustrating the integration of a monitoring feature in the knitted pattern, such as an electronic element.

Referring to FIG. 2, one example is shown for the knitted reinforcement layer 22. The layer is characterized by one or more sets of fibers and the knitted pattern forming a plurality of interlocking loops. More specifically, FIG. 2 illustrates two sets of fibers 60 and 62, and the fibers knitted in a meandering pattern such that a plurality of loops are formed in successive rows that join at interlocking loop points 64. FIG. 2 provides an example of how different sets of fibers can be used to provide distinct boundaries for changing performance characteristics of the tube while maintaining continuous material integrity without the need to overlap layers of material. For example, the first set of fibers 60 may have greater resistive properties, while the second set of fibers 62 may have greater conductive characteristics. Each set of fibers may include different types of fibers within each set that are also selected to provide the desired electrical or mechanical characteristics, or other characteristics. Therefore, one can appreciate the ability of the knitted reinforcement layer 20 to provide precise specifications for both strength and electrical conductivity/resistivity as a function of the geometry and location.

Referring to FIG. 3, a finished composite tube structure 10 is shown having a number of different features/characteristics. The area of the tube located at the bend 66 represents an area that may have a greater density knit pattern or additional fibers at the bend to better support the tube at that location, and also fibers knitted in a curvature that provides the bend shape. The knitted material shown at area 66 is covered by the matrix layer, but is shown as exposed for illustrative purposes in this figure to denote an area having a different knit pattern. Area 68 on the tube may represent an area having either a different type of matrix material applied, a different knitted pattern, or different knitted materials, the intent being to illustrate how a very small portion of the tube can be modified in performance characteristics, yet avoids traditional overlapping layers of matrix material that are prone to delamination. Area 70 illustrates yet another change in either the knitted reinforcement layer and/or the matrix material in order to support a protruding hardware element 46. Area 40 in FIG. 3 and FIG. 3B are intended to illustrate incorporation of an electronic element such as a strain gauge or temperature monitor that can be incorporated directly into the knitted pattern, or may itself be made of a fibrous material which can be knitted directly into the knitted layer 20. The electronic element could also be one which measures electrical static buildup and voltage differentials across various portions of the tube. Such electronic elements can be used to monitor the state of the tube, such as the internal pressure, temperature, and other environmental factors. FIG. 3A illustrates the reinforcement layer 20 with two intersecting tubes that are knitted together at intersecting knit line 44. At this location, sets of fibers from both sections of tube can be looped with one another for a very secure connection. When the matrix material is applied over the intersecting knit line 44, the matrix material is continuous and therefore a traditional laminated seam is avoided. The modified section 48 has a geometric shape that is quite different than a cylindrical tube. This section may be produced with the use of external fixtures (not shown), similar to the manner in which the fixture 16 holds the flange 34. Area 50 may represent a reinforced portion of the tube, such as by applying additional matrix material thereby thickening the tube wall and/or increasing the density of the knitted pattern. Although not shown, the tube could also be made in a very flat shape with a narrow internal cavity, this shape being referred to as a clearance flat.

Figure 4A:
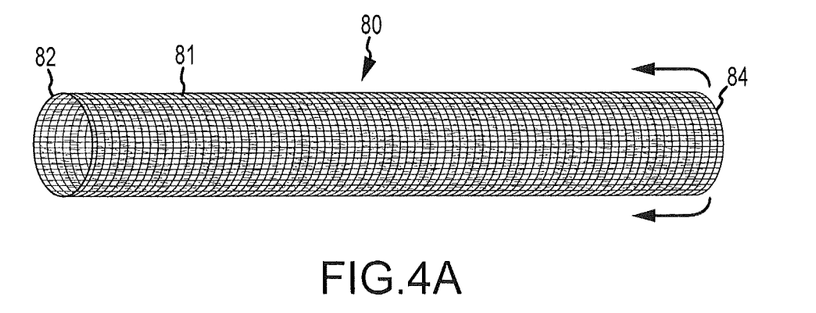
FIG. 4A is a perspective view of a tubular shaped knitted reinforcement layer according to a first embodiment of the method of reinforcement of the invention.
Figure 4B:
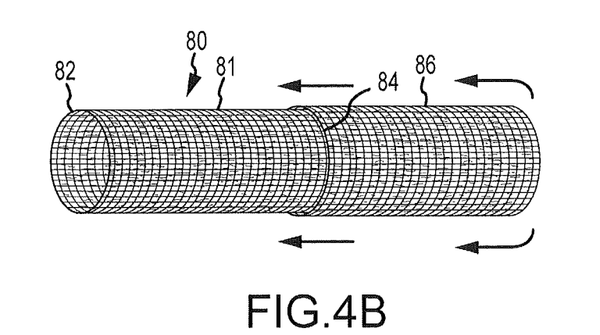
FIG. 4B is a perspective view of the knitted reinforcement layer of FIG. 4A, showing one end of the knitted reinforcement layer being folded back over itself.
Figure 4C:
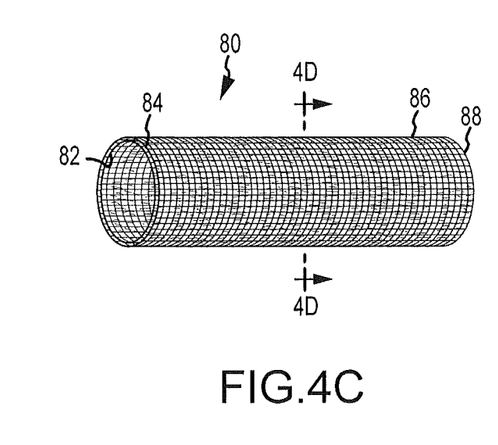
FIG. 4C is another perspective view of the knitted reinforcement layer of FIG. 4 showing the knitted reinforcement layer being fully folded back over itself, thereby creating a dual layered knitted reinforcement.
Figure 4D:
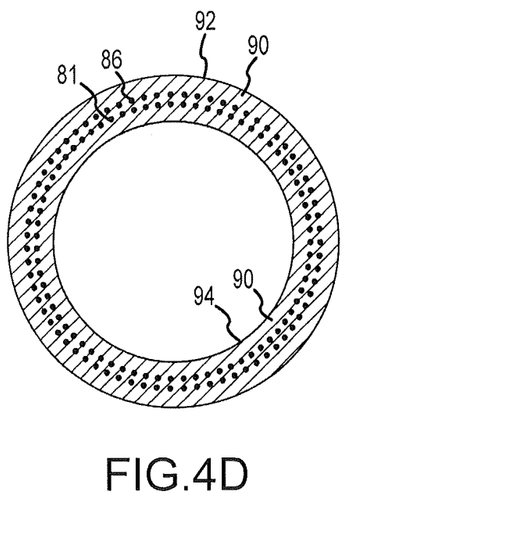
FIG. 4D is a cross-sectional view taken along line D-D of FIG. 4C illustrating the internal arrangement of the knitted reinforcement layers and matrix material in a finished composite tubing construction

In another aspect of the invention, a method is provided for reinforcing composite tubes by selectively configuring one or more knitted reinforcement layers of material to meet strength specifications for the tubes. Referring to FIGS. 4A-4D, a first preferred embodiment illustrates the method of the invention. A knitted reinforcement layer 80 is shown in a tubular configuration. The layer 80 includes respective first and second ends 82 and 84. In order to provide a dual reinforced layer, one of the ends 82/84 is folded back over the layer 80. Accordingly, the dual reinforcing layer includes a non-folded section 81 and a folded section 86. As shown in FIG. 4C, the material is folded such that the ends 82 and 84 lie adjacent to one another and are substantially coterminous with one another. A new folded end 88 is created at the opposite end of the folded material. With the configuration shown in FIG. 4C, a dual reinforcing layer is provided in which the knitted reinforcing material is capable of being selectively folded back over itself without compromising the structural integrity of the knitted reinforcing material. Because the knitted reinforcing material is flexible in multiple directions and planes, it is capable of being folded as shown without the requirement of special handling equipment. Contrast this advantage of a knitted reinforcement layer as compared to a woven reinforcement layer in which the ability to selectively fold is significantly impeded by the nature of woven strands. Referring to FIG. 4D, a cross-sectional view is provided of a finished reinforced composite tubing construction. A composite matrix material 90 has been applied to the folded knitted reinforcement layer such that the matrix material resides between the folded sections 81 and 86, and radially surrounds the folded sections 81 and 86. Accordingly, the applied matrix material 90 defines the interior surface 94 of the reinforced tube and the exterior surface 92 of the reinforced tube.

Figure 5A:
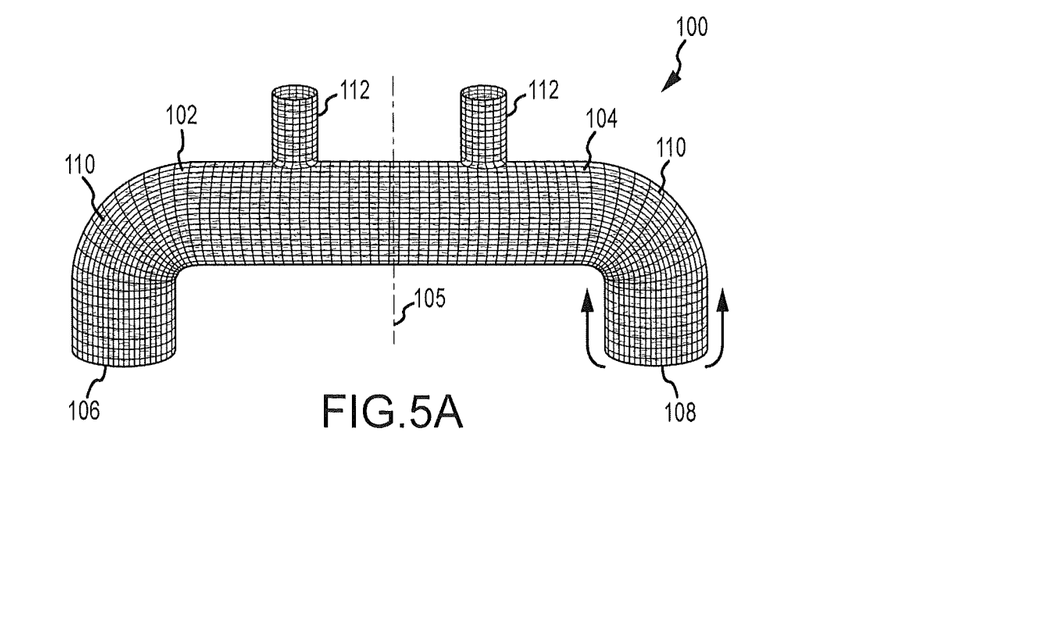
FIG. 5A is a perspective view of an irregular shaped knitted reinforcement layer according to a another embodiment of the method of reinforcement of the invention, including a first section having a shape corresponding to a composite tube to be manufactured, and a second section connected to the first section, and having a shape that is a mirror image of the first section.
Figure 5B:
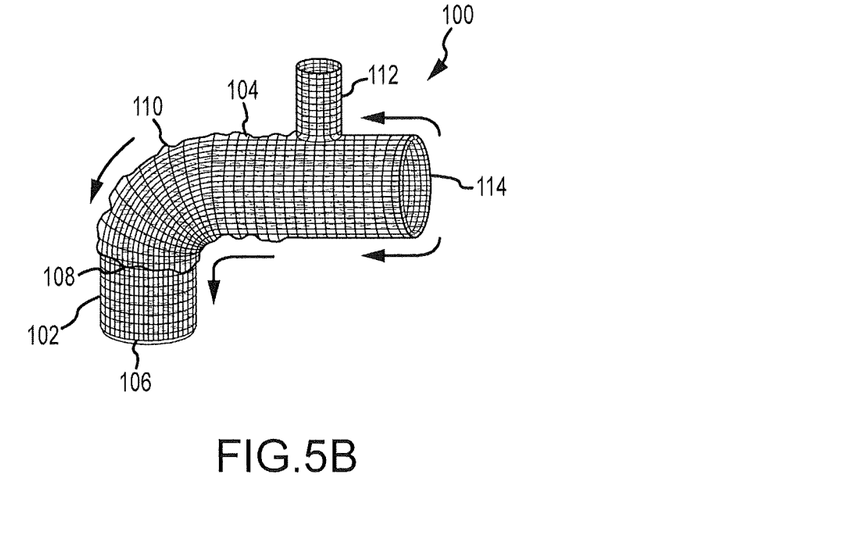
FIG. 5B is a perspective view of the knitted reinforcement layer of FIG. 5A, showing an end of the second section being folded back over the first section.
Figure 5C:
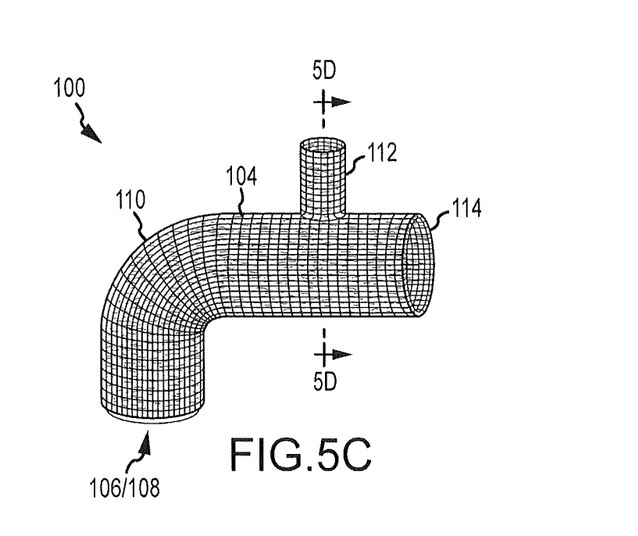
FIG. 5C is a perspective view of the knitted reinforcement layer of FIG. 5A, showing the second section being fully folded back over the first section, thereby creating a dual layered knitted reinforcement.
Figure 5D:
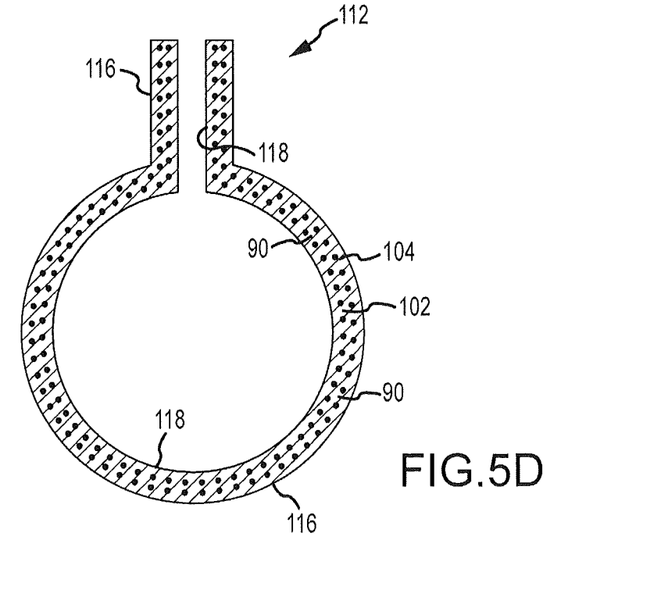
FIG. 5D is a cross-sectional view taken along line D-D of FIG. 5C illustrating the internal arrangement of the knitted reinforcement layers and matrix material in a finished composite tubing construction.

Referring to FIGS. 5A-5D, another preferred embodiment illustrates the method of the invention. In this embodiment, a knitted reinforcement layer 100 is configured in an irregular shape. The reinforcement layer 100 includes a first section 102 and a second section 104 that is a mirror image of the first section 102. The composite tube to be created has a 90° bend 110, and a protruding stem or extension 112. Bisecting lines 105 serves as the reference points over which the reinforcement layer is folded. As shown in FIG. 5B, the end 108 of the second section 104 is folded back over itself, and is then further folded so that the end 108 of the second section 104 approaches the end of 106 of the first section 102. As shown in FIG. 5C, the irregular shaped knitted reinforcement layer 100 has been fully folded such that the folded knitted reinforcement layer resembles the shape of the composite tube to be constructed, including the 90° bend 110 and the stem 112. In the final folded configuration, a new folded end 114 is created that is coterminous with the location of the bisecting line 105 of FIG. 5A, and the first and second ends 106 and 108 reside coterminous with one another at the opposite end. Not only is the primary flow path through the tube provided with a dual layer of knitted reinforcement, but so too is the protruding stem 112 by virtue of the mirror image shape of section 104. FIG. 5D illustrates a cross-sectional view of a finished composite tube in which matrix material 90 has been applied. Accordingly, the matrix material fills the gaps between the knitted reinforcement layers, and also defines the exterior surface 116 of the tube and the interior surface 118 of the tube. From a review of FIGS. 5A-5D, it is apparent that irregular and complex shapes for composite tubes can be provided with multiple layers of knitted reinforcement in which a single knitted element is used to create multiple reinforcing layers and without the requirement to knit and attach multiple reinforcement layers. The folded configuration of the knitted reinforcement layers provides a simple yet structurally robust design that enables nearly limitless combinations of knitted reinforcement layers within a single tube construction.

Figure 6A:
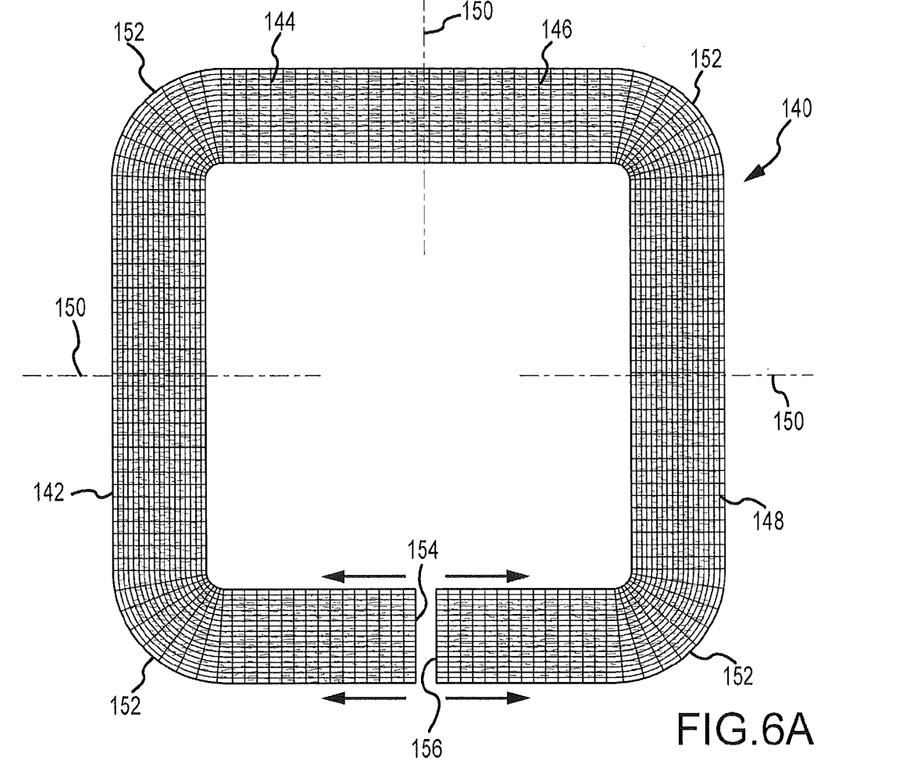
FIG. 6A is a perspective view of another irregular shaped knitted reinforcement layer according to another embodiment of the method of reinforcement of the invention, including a first section having a shape corresponding to a composite tube to be manufactured, and three additional sections connected in series to one another, and each additional section having a shape that is a mirror image of the first section.
Figure 6B:
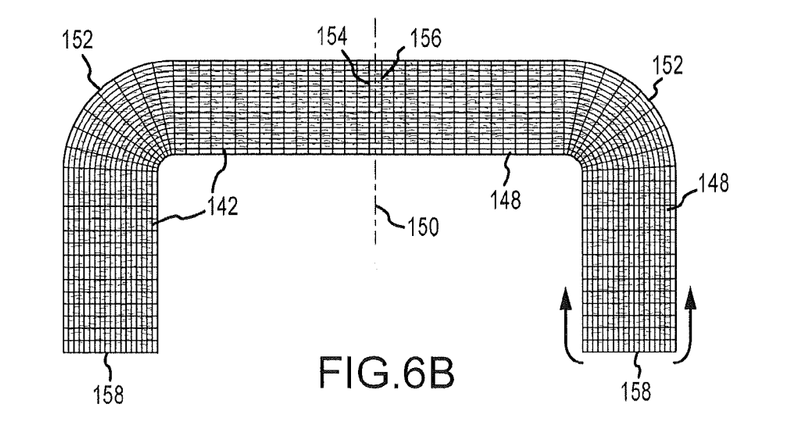
FIG. 6B is a perspective view of the knitted reinforcement layer of FIG. 6A, showing the ends of two of the sections being folded back over the remaining two sections.
Figure 6C:
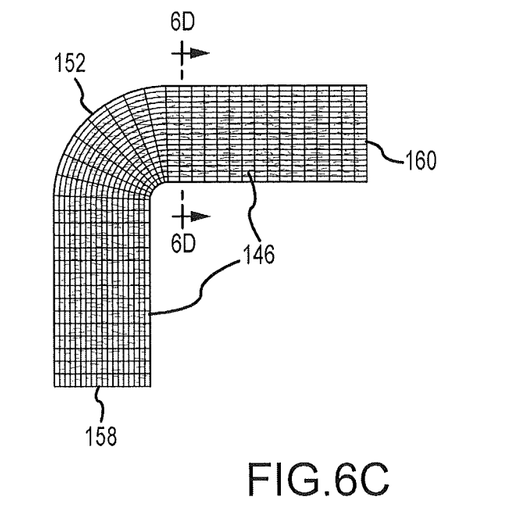
FIG. 6C is a perspective view of the knitted reinforcement layer of FIG. 5B, showing one end of the folded section of FIG. 6B being folded again back over the remaining section thereby creating a four layered knitted reinforcement.
Figure 6D:
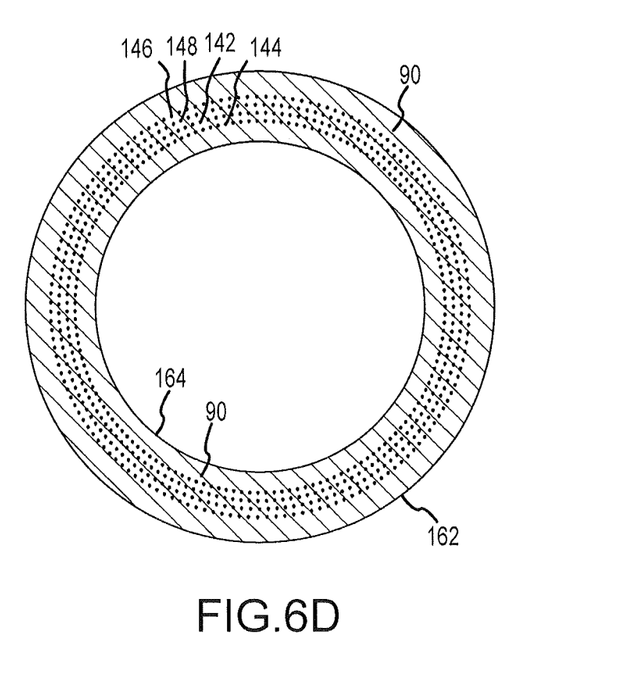
FIG. 6D is a cross-sectional view taken along line D-D of FIG. 6C illustrating the internal arrangement of the knitted reinforcement layers and matrix material in a finished composite tubing construction.

Referring to FIGS. 6A-6D, another preferred embodiment illustrates the method of the invention. In this embodiment, a four layered knitted reinforcement is provided. Referring first to FIG. 6A, a knitted reinforcement tube 140 is provided with four distinct 90° bends 152. The knitted reinforcement tube 140 has a first end 154 and a second end 156. Conceptually, the knitted configuration shown in FIG. 6A can be considered as four distinct sections, namely, sections 142, 144, 146, and 148. In order to create the four layered knitted reinforcement, three of the four sections must be folded over one another in some consecutive manner to form the desired shape for the composite tube, namely, a tube with a single 90° bend. In one method of folding, three sections are folded about reference lines 150, in which a pair of first folds are created by folding section 142 over section 144, and folding section 148 over section 146. Two new folded ends are created by this initial folding step, namely, folds 158 located at both ends of the partially folded knitted material. As shown in FIG. 6B, the original ends 154 and 156 abut one another about the remaining reference line 150. Next, a final fold is made in which sections 146 and 148 are folded over sections 142 and 144. A final folded shape is shown in FIG. 6C in which the folded sections are combined to produce the final tube shape having the single 90° bend. The last fold made forms end 160 which is coterminous with the location of the remaining reference line 150 shown in FIG. 6B. FIG. 6D illustrates a cross-sectional view of a finished composite tube in which the matrix material 90 has been applied. Accordingly, the matrix material fills the gaps between the knitted reinforcement layers, and also defines the exterior surface 162 of the tube and the interior surface 164 of the tube.

Figure 7A:
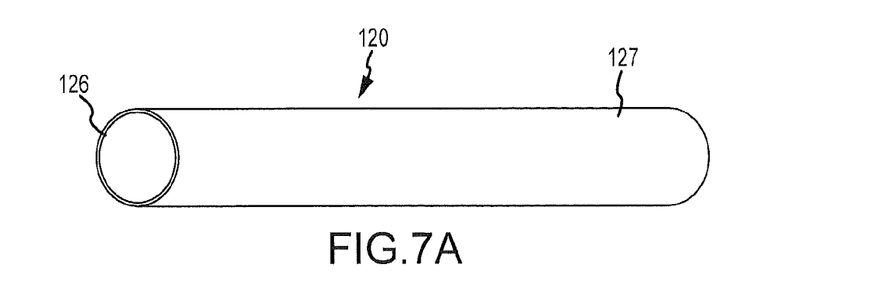
FIG. 7A is a perspective view of an inner tube or shell for use in another embodiment of the method of reinforcement of the invention.
Figure 7B:
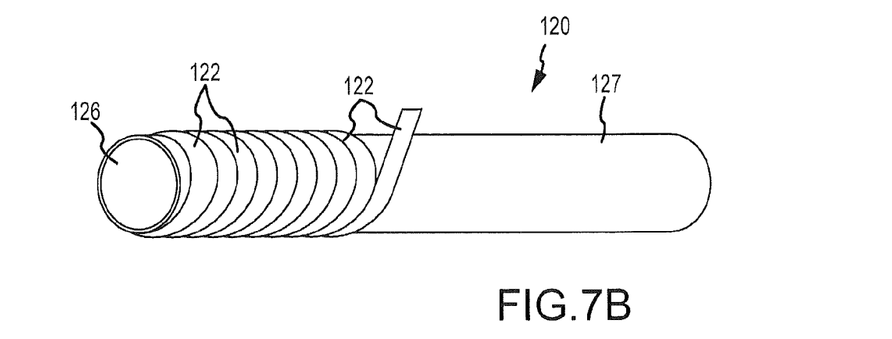
FIG. 7B is a perspective view of the inner tube of FIG. 7A, illustrating a partially installed reinforcing wrap secured over the inner tube in a helical configuration.
Figures 7C, 7D:
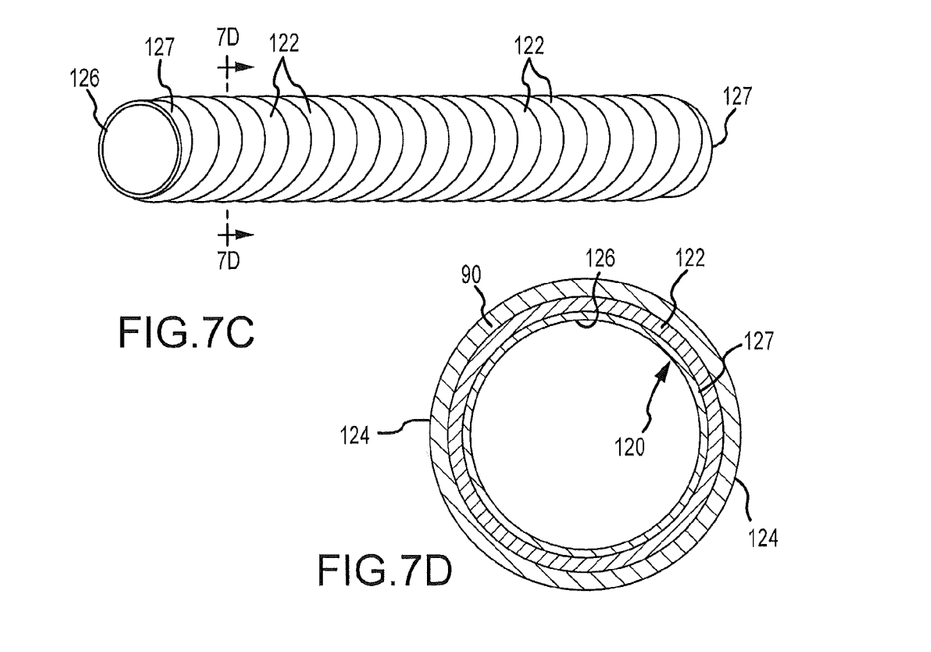
FIG. 7C is a perspective view of the fully installed reinforcing wrap secured over the inner tube.
FIG. 7D is a cross-sectional view taken along line D-D of FIG. 7C illustrating the internal arrangement of the reinforcing wrap and matrix material in a finished composite tubing construction.

Referring to FIGS. 7A-7D, another preferred embodiment illustrates the method of the invention. In this embodiment, reinforcement for composite tubes is provided by wrapping reinforcing material around an existing composite tube or inner tube shell. Referring to FIG. 7A, an existing composite tube or inner tube shell 120 is provided having an interior surface 126 and an exterior surface 127. A reinforcing material 122 is wrapped around the exterior surface 127 of the tube 120. The reinforcing material 122 could include twisted strands of fiber and/or wire material, the same material used in the construction of the knitted reinforcement layers of the other embodiments, or combinations thereof. As shown, the reinforcing material 122 can be wrapped in a helical configuration. It is however contemplated that other geometrical wrapping arrangements can be provided, to include multiple layers of reinforcing material 122 in various woven or interlocking patterns. FIGS. 7B and 7C illustrate this helical wrapping configuration. FIG. 7D illustrates a cross-sectional view of a finished composite tube in which matrix material 90 has been applied. Accordingly, the matrix material fills the gaps between strands of reinforcing material 122 and defines the exterior surface 124 of the tube. In this embodiment, the interior surface of the tube is defined by the interior surface 126 of the existing composite tube or shell 120.

Figure 8A:
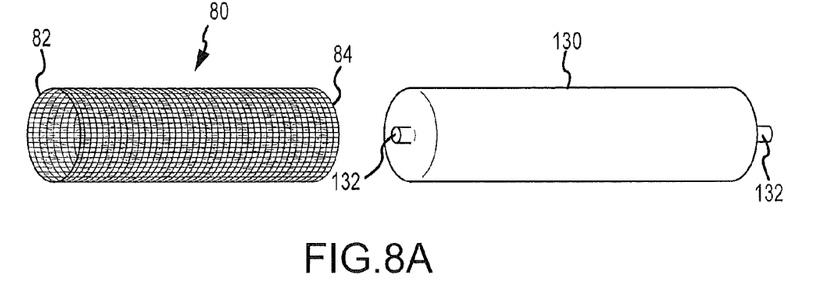
FIG. 8A is a perspective view of a tubular shaped knitted reinforcement layer, and an inner inflatable balloon element according to another embodiment of the method of reinforcement of the invention.
Figure 8B:
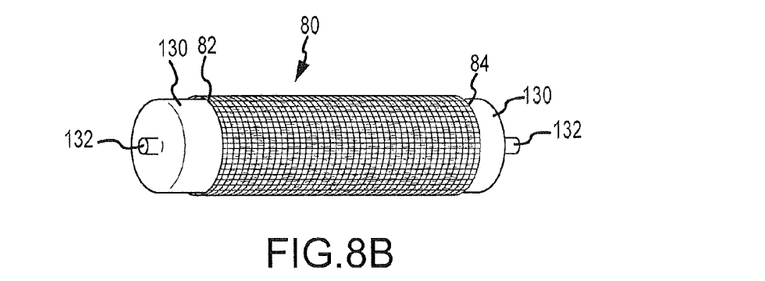
FIG. 8B is a perspective view of the tubular shaped knitted reinforcement layer of FIG. 8A, showing the inner inflatable balloon element placed within the hollow interior of the tubular shaped knitted reinforcement layer.
Figures 8C, 8D:
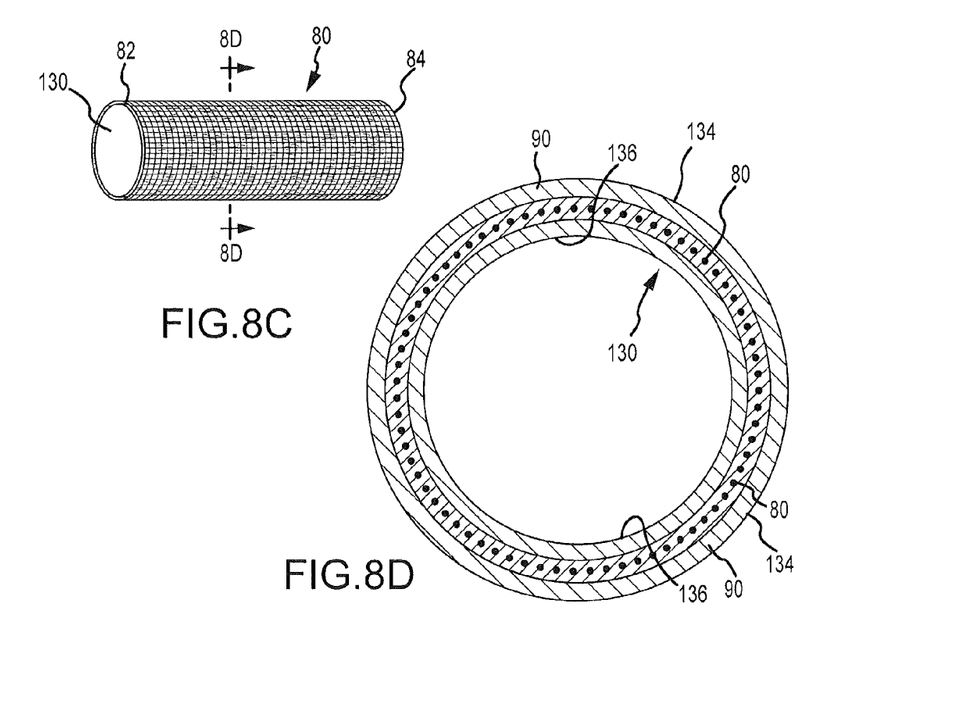
FIG. 8C is a perspective view of the tubular shaped knitted reinforcement layer of FIG. 8B, showing the inner balloon element with the ends of the balloon element removed for purposes of showing how the inner balloon element serves as an interior supporting layer.
FIG. 8D is a cross-sectional view taken along line D-D of FIG. 8C illustrating the internal arrangement of the inner balloon element, the knitted reinforcement layer, and matrix material in a finished composite tubing construction.

Referring to 8A-8D, another preferred embodiment illustrates the method of the invention. In this embodiment, one or more knitted enforcement layers are provided, along with an interior flexible and/or elastomeric element that may serve as both a structural supporting layer and a chemical barrier layer. Referring to FIG. 8A, a knitted reinforcement layer 80 is shown as being the same as the knitted reinforcement layer 80 of FIG. 4A. This reinforcement layer 80 is supplemented with an interior inflatable balloon element 130. The shape of the inflated balloon element 130 can be chosen to match the desired final shape of the composite tube to be manufactured. In the example of FIG. 8A, the balloon element 130 is shown as having a cylindrical shape; however, the balloon element could have one or more bends, or can have any irregular shape to match the final shape of the composite tube to be manufactured. In this aspect of the balloon element 130, it has the same functionality as the spiraled inner bladder 12 as previously described with respect to FIG. 1. Referring to FIG. 8B, the balloon element 130 is inserted within the hollow interior of the knitted reinforcement layer 80. As shown, the balloon element extends beyond the ends 82 and 84 of the reinforcement layer 80. One or more inflation ports 132 may be incorporated on the balloon element 134 to inflate/deflate the balloon element. Referring to FIG. 8C, the ends of the balloon element are removed in order to visualize the balloon element serving as an interior support layer for the tube construction. FIG. 8D illustrates a cross-sectional view of a finished composite tube in which matrix material 90 has been applied.

Accordingly, the matrix material fills the gaps within the knitted reinforcement layer, and extends outwardly beyond the knitted reinforcement layer 80, thereby defining the exterior surface 134. In this embodiment, the interior surface of the tube 136 is defined by the interior surface of the inflatable balloon element 130.

Although the preferred embodiments in FIGS. 4-8 illustrate particular thicknesses for the reinforcing layers/materials as well as thicknesses for the applied matrix material, is should be understood that the elements of these preferred embodiments are not limited to any particular thickness, and the figures are therefore not necessarily drawn to scale and rather are drawn for illustration purposes to visualize the various elements.

In addition to the methods of the invention for creating reinforcement for composite tubing, the invention may also be considered as additional embodiments of composite tubing that incorporate the various types of reinforcement elements, including the folded knitted reinforcement layers, the reinforcing wrap, and the inflatable balloon element.

In another aspect of the present invention, a composite tube system is provided for incorporation within a larger assembly such as an aircraft or vehicle. According to the system, a plurality of separate composite tubes form a fluid conveying network with tubes having various diameters, lengths, and shapes. Because of the ease at which shape and diameter modifications can be achieved, the composite tube system is highly adaptable for applications in which there are constrained spaces for mounting a fluid conveying network, such as a fuel system.

While the present invention has been set forth in various embodiments, it shall be understood that changes and modifications to the preferred embodiments can be made within the scope of the claims appended hereto.

What is claimed is:

1. A method of reinforcing a composite tube comprising:
providing a knitted reinforcement material comprising a plurality of interlocking loops of fiber, said knitted reinforcement material having first and second ends;
folding said second end of said material back over itself towards said first end to form a dual layered configuration; and
applying a matrix over said dual layered configuration, said matrix comprising resin and epoxy constituents, said matrix filling voids between said loops of fiber and between and around both layers of said dual layered configuration, said matrix having an internal surface extending radially inward beyond an inner layer of said dual layered configuration and an external surface extending radially outward beyond an outer layer of said dual layered configuration thereby forming a reinforced composite tube of a desired thickness; and
wherein said knitted reinforcement material has a variable diameter along its length and at least one non-circular cross-sectional area defining at least one of a plurality of end configurations, said end configurations comprising at least one of a flange, a coupler, an extension, or a junction.

2. A method, as claimed in claim 1, wherein:
said reinforced composite tube is tuned for desired electrical properties including resistivity and conductivity performance characteristics by selecting said fiber from one or more conductive or non-conductive fibers or wires.

3. A method, as claimed in claim 1, wherein:
said material is selectively folded to form a shape corresponding to a final shape to be formed for said composite tube.

4. A method, claimed in claim 1 wherein:
said fiber includes at least first and second fibers or wires each having different electrical properties.

5. A method, claimed in claim 4, wherein:
at least one of said first or second fibers or wires includes selected strands of having selected electrical or mechanical properties.

6. A method, claimed in claim 1, wherein:
said knitted reinforcement material comprises the interlocking loops arranged in a plurality of rows and columns, adjacent rows and adjacent columns being interlocked with one another, wherein said fibers follow meandering non-parallel paths thereby forming said plurality of interlocking loops.

7. A method, claimed in claim 1, wherein:
said dual layered configuration has first and second ends, and said second end is folded back over itself toward the first end to form a multi-layered configuration having more than two layers of said knitted reinforcement material.

8. A method of reinforcing a composite tube comprising:
providing a knitted reinforcement material comprising a plurality of interlocking loops of fiber, said knitted reinforcement material having first and second ends;
folding said second end of said material back over itself towards said first end to form a dual layered configuration; and
applying a matrix over said dual layered configuration, said matrix comprising resin and epoxy constituents, said matrix filling voids between said loops of fiber and between and around both layers of said dual layered configuration, said matrix having an internal surface extending radially inward beyond an inner layer of said dual layered configuration and an external surface extending radially outward beyond an outer layer of said dual layered configuration thereby forming a reinforced composite tube of a desired thickness; and
wherein said second end of said material is folded back over itself so said first and second ends lie adjacent one another and are substantially coterminous thereby forming said dual layered configuration along substantially all of a length of the dual layered configuration.

9. A method, as claimed in claim 1, wherein:
said second end of said material is folded back over itself so said first and second ends are separated from one another thereby forming said dual layered configuration only along a portion of a length of the dual layered configuration.

10. A method of reinforcing a composite tube comprising:
providing a knitted reinforcement material comprising a plurality of interlocking loops of fiber, said knitted reinforcement material having first and second ends;
folding said second end of said material back over itself towards said first end to form a dual layered configuration; and
applying a matrix over said dual layered configuration, said matrix comprising resin and epoxy constituents, said matrix filling voids between said loops of fiber and between and around both layers of said dual layered configuration, said matrix having an internal surface extending radially inward beyond an inner layer of said dual layered configuration and an external surface extending radially outward beyond an outer layer of said dual layered configuration thereby forming a reinforced composite tube of a desired thickness; and
wherein said knitted reinforcement material has a tubular shape along a portion of a length of said knitted reinforcement material, and a remaining portion of said length has a non-tubular shape.

11. A method of reinforcing a composite tube comprising:
providing a knitted reinforcement material comprising a plurality of interlocking loops of fiber, said knitted reinforcement material having first and second ends;
providing an interior inflatable balloon element placed in contact with an interior surface of said knitted reinforcement material; and
applying a matrix over said knitted reinforcement material, said matrix comprising resin and epoxy constituents, said matrix filling voids between said loops of fiber, said matrix having an internal surface in contact with said interior inflatable balloon element and an external surface extending radially outward and beyond said knitted reinforcement material, thereby forming a reinforced composite tube of a desired thickness in which an interior surface of said composite tube is defined by an interior surface of said inflatable balloon element, and an exterior surface of said composite tube is defined by said external surface of said matrix; and
wherein said knitted reinforcement material has a tubular shape along a portion of a length of said knitted reinforcement material, and a remaining portion of said length has a non-tubular shape.

12. A method, as claimed in claim 11, wherein:
said reinforced composite tube is tuned for desired electrical properties including resistivity and conductivity performance characteristics by selecting said fiber from one or more conductive or non-conductive fibers or wires.

13. A method, as claimed in claim 11, wherein:
said knitted reinforcement material has a tubular shape.

14. A method, as claimed in claim 11, wherein:
said interior inflatable balloon element has a tubular shape thereby imparting a corresponding tubular shape onto said knitted reinforcement layer by pressure from said inflatable balloon element applied to an interior surface of said knitted reinforcement layer.

15. A method, as claimed in claim 11, wherein:
said interior inflatable balloon element has a portion thereof with a non-tubular shape thereby imparting the non-tubular shape onto the remaining portion of said knitted reinforcement layer by pressure from said inflatable balloon element applied to an interior surface of said knitted reinforcement layer.

16. A reinforced composite tube comprising:
a knitted reinforcement material comprising a plurality of interlocking loops of fiber, said knitted reinforcement material having first and second ends;
said second end of said material folded back over itself towards said first end to form a dual layered configuration; and
a matrix applied over said dual layered configuration, said matrix comprising resin and epoxy constituents, said matrix filling voids between said loops of fiber and between and around both layers of said dual layered configuration, said matrix having an internal surface extending radially inward beyond an inner layer of said dual layered configuration and an external surface extending radially outward beyond an outer layer of said dual layered configuration thereby forming a reinforced composite tube of a desired thickness; and
wherein said knitted reinforcement material has at least one of (a) a non-circular cross-sectional area defining at least one of a plurality of end configurations, and (b) said second end of said material is folded back over itself so said first and second ends lie adjacent one another and are substantially coterminous thereby forming said dual layered configuration along substantially all of a length of the dual layered configuration.

17. A reinforced composite tube comprising:
a knitted reinforcement material comprising a plurality of interlocking loops of fiber, said knitted reinforcement material having first and second ends;
an interior inflatable balloon element placed in contact with an interior surface of said knitted reinforcement material; and
a matrix applied over said knitted reinforcement material, said matrix comprising resin and epoxy constituents, said matrix filling voids between said loops of fiber, said matrix having an internal surface in contact with said interior inflatable balloon element and an external surface extending radially outward and beyond said knitted reinforcement material, thereby forming said reinforced composite tube of a desired thickness in which an interior surface of said composite tube is defined by an interior surface of said inflatable balloon element, and an exterior surface of said composite tube is defined by said external surface of said matrix; and
wherein said knitted reinforcement material has at least one of (a) a non-circular cross-sectional area defining at least one of a plurality of end configurations, and (b) said second end of said material is folded back over itself so said first and second ends lie adjacent one another and are substantially coterminous thereby forming a dual layered configuration along substantially all of a length of the dual layered configuration.

18. A reinforced composite tube comprising:
an inner tube member;
a reinforcing layer wrapped over an exterior surface of said inner tube member, said reinforcing layer having a first end and a second end;
a first matrix material applied over said reinforcing layer, said first matrix material including resin and epoxy constituents; and
wherein a composite tube is formed in which an interior surface of said composite tube is defined by an interior surface of said inner tube member and an exterior surface of said composite tube is defined by an external surface of said first matrix material; and
wherein said reinforcing layer has at least one of (a) a non-circular cross-sectional area defining at least one of a plurality of end configurations, and (b) said second end of said reinforcing layer is folded back over itself so said first and second ends lie adjacent one another and are substantially coterminous thereby forming a dual layered configuration along substantially all of a length of the dual layered configuration.

19. A reinforced composite tube, as claimed in claim 18, wherein:
said inner tube member comprises (i) a knitted reinforcement layer including a plurality of interlocking loops of fiber formed in a plurality of rows, and said adjacent rows interlocking one another to form a knitted pattern, and (ii) a second matrix material applied to said knitted reinforcement layer.

* * * * *